United States Patent
Brueggen et al.

[11] Patent Number: 5,466,084
[45] Date of Patent: Nov. 14, 1995

[54] DUST BOOT RETAINER RING

[75] Inventors: Shane J. Brueggen, Cashion; Alan Martin, Blanchard, both of Okla.

[73] Assignee: Dana Corporation, Toledo, Ohio

[21] Appl. No.: 260,947

[22] Filed: Jun. 16, 1994

[51] Int. Cl.[6] ............................................. F16C 11/00
[52] U.S. Cl. ...................... 403/134; 403/50; 277/212 FB
[58] Field of Search ............................... 403/134, 122, 403/50, 51, 133, 135; 277/166, 212 FB; 464/178

[56] References Cited

U.S. PATENT DOCUMENTS

| | | | |
|---|---|---|---|
| 3,024,050 | 3/1962 | Moskovitz | 287/90 |
| 3,147,537 | 9/1964 | Fadow | 29/149.5 |
| 3,175,834 | 3/1965 | Wallace et al. | 277/212 |
| 3,225,420 | 12/1965 | Sullivan | 29/149.5 |
| 3,262,706 | 7/1966 | Hassan | 277/29 |
| 3,284,115 | 11/1966 | Schmidt | 287/87 |
| 3,292,957 | 12/1966 | Ulderup | 287/87 |
| 3,322,445 | 5/1967 | Hassan | 287/90 |
| 3,403,932 | 10/1968 | Kutcher | 277/212 FB X |
| 3,476,417 | 11/1969 | Born et al. | 287/87 |
| 3,547,474 | 12/1970 | Colletti et al. | 277/212 FB X |
| 3,901,518 | 8/1975 | Uchida | 277/212 |
| 4,121,844 | 10/1978 | Nemoto et al. | 277/212 FB |
| 4,322,175 | 3/1982 | Szczesny | 403/1345 |
| 4,856,795 | 8/1989 | DeLano et al. | 277/212 |
| 4,921,368 | 5/1990 | Busse et al. | 403/50 X |
| 5,066,159 | 11/1991 | Urbach | 277/212 FB X |

FOREIGN PATENT DOCUMENTS

| | | | |
|---|---|---|---|
| 2445105 | 4/1975 | Germany | 403/134 |
| 203712 | 8/1989 | Japan | 403/134 |
| 193405 | 8/1989 | Japan | 403/134 |

*Primary Examiner*—Randolph A. Reese
*Assistant Examiner*—Harry C. Kim
*Attorney, Agent, or Firm*—Dykema Gosestt

[57] ABSTRACT

A boot assembly used with a Joint assembly has an elastomeric boot and an annularly shaped retainer ring. The elastomeric boot is approximately cup shaped and has an axis with a cavity therealong. A substantially coaxial first aperture at a base portion of the boot opens to the cavity. The retainer ring is substantially concentric with the first aperture of the boot and is secured to the boot at the base portion. The retainer ring has a plurality of radially inwardly extending fingers. Each finger has a finger aperture therethrough reducing a bending strength of the finger in response to an axial force thereagainst.

10 Claims, 2 Drawing Sheets

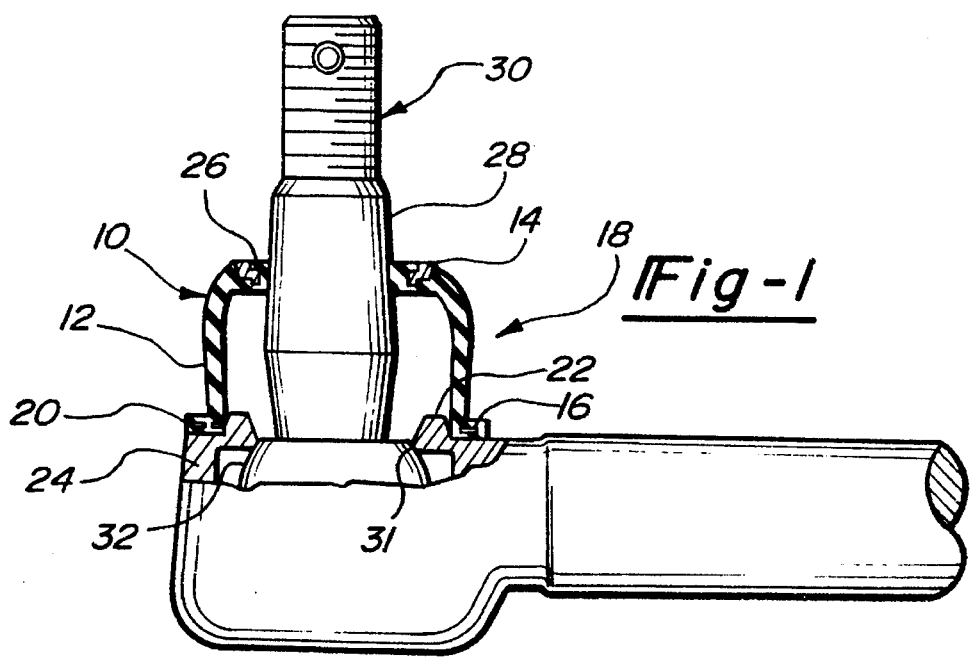
Fig-1
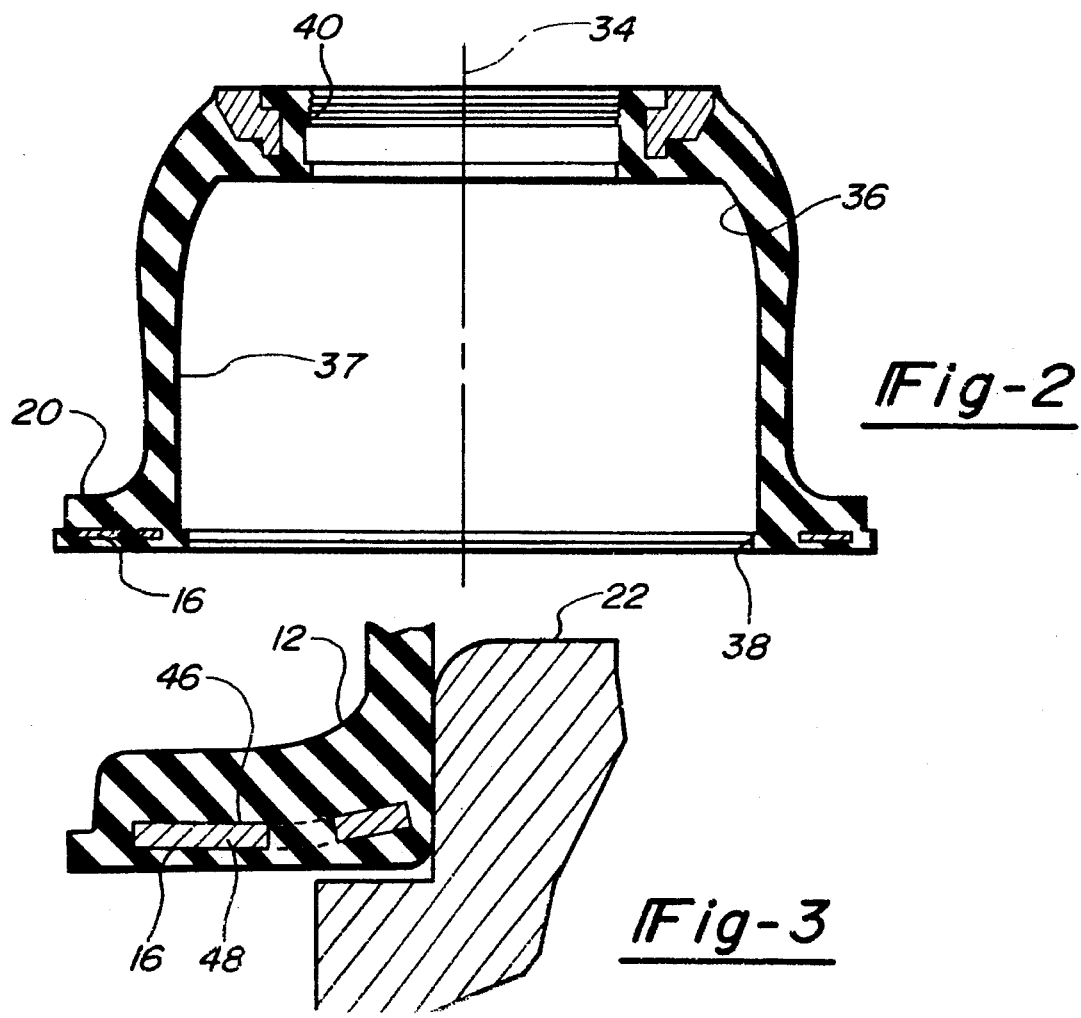
Fig-2
Fig-3

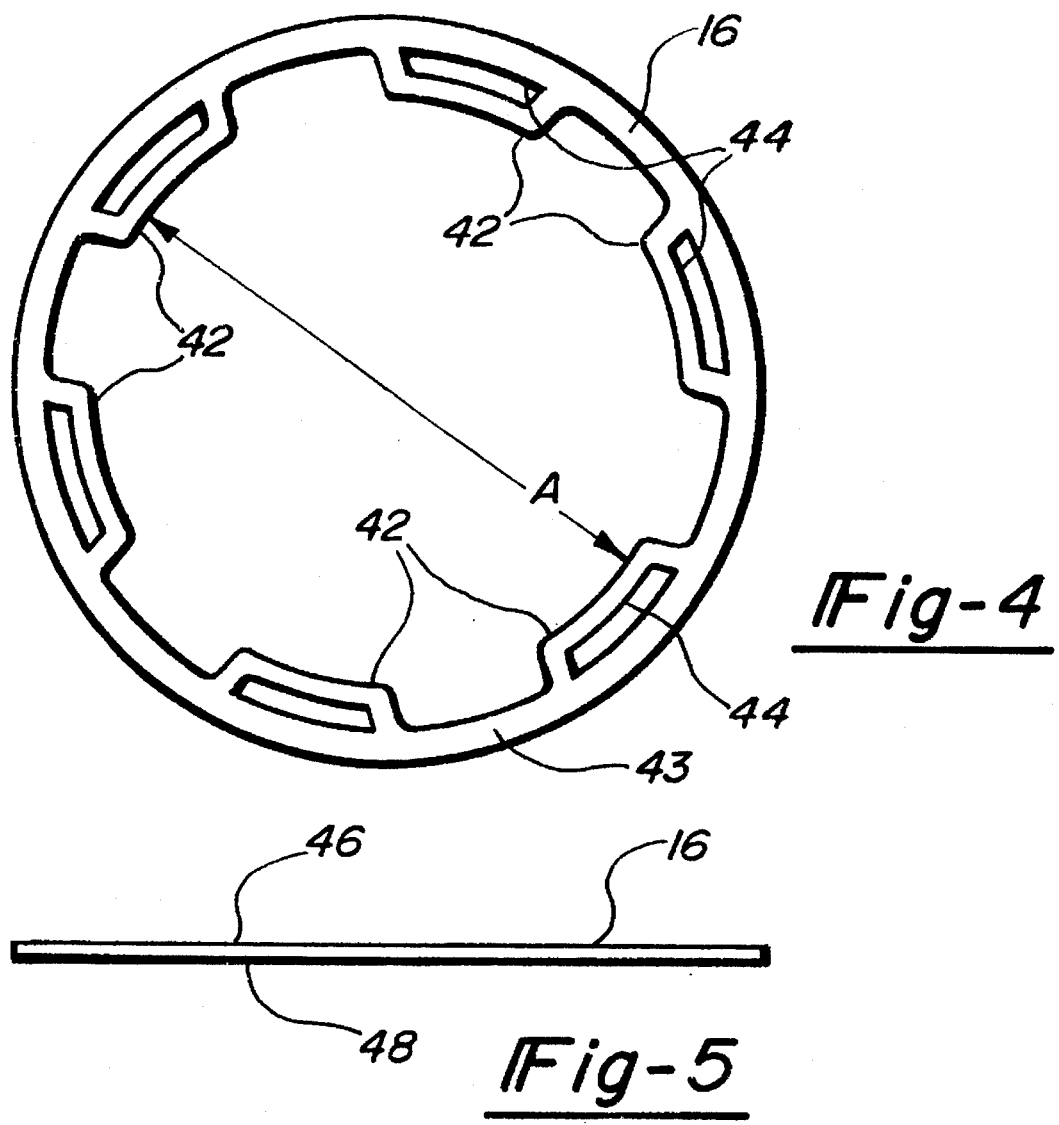

5,466,084

DUST BOOT RETAINER RING

FIELD OF THE INVENTION

The present invention relates to improvements in dust boot assemblies for use with pivoting joints, and more particularly to dust boot retainer rings.

BACKGROUND OF THE INVENTION

Dust boot assemblies are commonly employed in vehicle suspension systems to protectively seal ball joint assemblies in components such as tie rod ends. The dust boot assembly both retains lubricant, including grease, within the ball joint, and prevents contamination of the ball joint by shielding it from road dirt and other contaminants. The boot assemblies are retained on a mating component such as a tie rod by a retainer ring. The retainer ring is disposed at a base of the boot and defines an opening to a cavity of the boot thereat. The retainer rings are often partially or completely encased by the rubber boot. The retainer ring also commonly has a plurality of fingers or tabs extending radially inwardly which are adapted to engage a housing surface of the tie rod. A diameter formed by ends of the fingers is smaller than a diameter of the housing engaged by the fingers. The fingers deflect outward in response to the boot being pushed down over the housing. Resultant engagement between the fingers and the housing produce a braking action resisting removal of the boot from the tie rod end. Installation of boots on the tie rod end requires a sufficiently high axial force or push down load to produce the desired engagement with the housing.

The push down load has been known to damage the dust boot during installation. In some circumstances, the elastomeric boot portion separates from the retainer ring.

In short, known retainer ring designs require high installation loads for boots, potentially resulting in the boot being compromised during installation.

SUMMARY OF THE INVENTION

A disclosed boot assembly for use with a joint assembly includes an elastomeric boot and an annularly shaped retainer ring. The elastomeric boot is approximately cup shaped and has a longitudinal axis with a cavity therealong. A substantially coaxial first aperture at a base portion of the boot opens into the cavity. The retainer ring is substantially concentric with the first aperture of the boot and is bonded to the boot at the base portion. The retainer ring has a plurality of radially inwardly extending fingers. Each finger has a finger aperture therethrough which reduces a bending strength of the finger in response to an axial installation force against the ring with fingers engaging a housing surface.

The fingers and the apertures therethrough are configured in such a manner that an axial push-on load engaging the boot assembly with a housing of a tie rod end is significantly lower than with conventional retainer rings having no finger apertures. Additionally, the finger apertures provide improved mechanical bonding between the boot and the retainer ring with elastomeric material being disposed on both sides of the retainer ring as well as in the finger apertures. The objects of the present invention can be best understood from the following specification and drawings of which the following is a brief description.

BRIEF DESCRIPTION OF THE DRAWINGS

FIG. 1 is a partial cross-sectional view of a rod end with a ball joint and a dust boot in section.

FIG. 2 is an enlarged cross-sectional view of the boot assembly of FIG. 1.

FIG. 3 is a yet further enlarged cross-sectional view of a base portion of the dust boot assembly of FIG. 2 in a partially installed position.

FIG. 4 is a planar view of a retainer ring of the dust boot assemblies of FIGS. 1–3.

FIG. 5 is a front view of the retainer ring.

DESCRIPTION OF A DETAILED EMBODIMENT

A dust boot assembly 10 illustrated in FIG. 1 includes a boot or boot seal 12, an upper insert 14, and a retainer ring 16. The boot assembly 10 seals a pivotal joint assembly such as a tie rod end Joint 18, both excluding contaminants from the Joint 18 and retaining lubricant such as grease therein. In an installed position, the dust boot assembly 10 has a base portion 20 engaging a lip portion 22 of a housing 24 of the tie rod end joint 18. The dust boot assembly 10 is substantially cup shaped, extending from the base portion 20 to an upper portion 26. The upper portion 26 seals against a tapered shank 28 of a ball stud 30, or pivot member, which extends from the housing 24 through an opening 31 therein. The lip portion 22 circumscribes the opening 31. A ball portion 32 of the ball stud 30 is disposed within the housing 24 of the rod end joint 18.

As shown in FIG. 2, dust boot seal 12 has a central longitudinal axis 34 therethrough. The dust boot seal 12 has a cup shaped cavity 36, centered on the axis 34, which provides the boot 12 with flexible walls 37 of approximately constant thickness. The boot seal 12 has a first aperture 38 which opens into the cavity 36 at the base portion 20 and is sized to fit over the lip portion 22 of the housing 24. The boot seal 12 has a second aperture 40 substantially concentric with the first aperture 38 opening into the cavity 36 in the upper portion 26 of the boot assembly 10. The second aperture 40 is sized to seal against the tapered shank 28. The boot seal 12 is formed of an elastomeric material such as neoprene.

The upper insert 14 of dust boot assembly 10 is formed from glass filled nylon. The upper insert 14 helps maintain a sealing condition between the tapered shank 28 and the boot seal 12 by restricting radial expansion of the second aperture 40.

The retainer ring is formed of metal such as SAE 1065 steel. The retainer ring 16 has an annular shape as illustrated in FIG. 4. The ring 16 is substantially flat. The ring 16 is bonded to the boot seal 12 at the base portion 20 and is substantially concentric with the first aperture 38.

The retainer ring 16 has a plurality of fingers 42 or tabs extending radially inwardly from an annular portion 43. Each finger 42 has a finger aperture 44 open in a direction substantially parallel to the axis 34. The elastomeric boot seal 12 is disposed in part in the finger apertures 44. The neoprene material of the boot seal passes from a first side 46 of the ring 16 through the aperture 44 to a second side 48 of the ring 16, thus providing a mechanical bond between the retainer ring 16 and the boot seal 12.

The fingers 42 are adapted to provide a lower bending strength than known unperforated fingers in response to an axial force against the fingers. This results in a lower push-on load for a resultant retainer ring 16 when installed over a shaft of a predetermined diameter.

The resultant boot assembly 10 has a relatively low push-on or installation load, yet provides an adequately high resistance to removal and superior boot seal 12 to ring 16 bonding. A sample specimen having an inside diameter A defined by tips of the fingers 42 equal to a nominal value of 34.77 mm (1.369 inches) was tested by pressing it over a 35.05 mm (1.380 inch) hollow mill diameter. The boot assembly was then pulled off the hollow mill. A load of 515 newtons (116 pounds force) was required to remove the boot assembly from the mill, with the boot seal remaining intact and attached to the retainer ring 16. A second test with a boot assembly having a similarly sized retainer ring pressed over a 1.390 inch hollow mill was pulled off the mill at 919 newtons (207 pounds force) with the boot remaining in tact.

Preferred embodiments have been disclosed. A worker of ordinary skill in the art would realize, however, that certain modifications would come within the teaching of this invention. For example, it may be desirable to have a greater number of tabs or fingers 42 than illustrated in the figures. Likewise, it may be preferred to provide more than one aperture in each finger, thus slightly increasing the bending strength of the fingers 42 with minimal effect on the improved mechanical bonding strength. The following claims should be studied in order to determine the true scope and content of the invention.

We claim:

1. A boot assembly for use with a joint assembly comprising:

an elastomeric boot being approximately cup shaped having an axis and defining a cavity therealong with a substantially coaxial first aperture at a base portion thereof; and an annularly shaped substantially flat retainer ring secured to the boot at the base portion and being substantially concentric with the first aperture and having a plurality of radially inwardly extending fingers with a finger aperture in each finger, wherein the finger apertures reduce a bending strength of the fingers in response to an axial force thereagainst.

2. A boot assembly as claimed in claim 1, wherein the apertures in the fingers are open in a direction substantially parallel to the axis.

3. A boot assembly as claimed in claim 1, wherein the elastomeric boot is disposed in part in the finger apertures.

4. A boot assembly as claimed in claim 1, wherein the boot passes from a first side of the ring through the finger apertures to a second side of the ring.

5. A retainer ring for use with an elastomeric sealing boot, the ring comprising:

a substantially flat annular portion; and a plurality of fingers unitary with the annular portion and extending radially inwardly with an aperture in each finger, wherein the finger apertures reduce a bending strength of the fingers in response to a force thereagainst in a direction substantially normal to the flat annular portion.

6. A retainer ring as claimed in claim 5, wherein the apertures in the fingers are open in a direction substantially normal to the flat annular portion.

7. A pivotal joint assembly comprising:

a link member housing having a lip portion circumscribing an opening therein;

a pivot member rotatably disposed in the housing with a shank portion extending through the opening;

an elastomeric boot being approximately cup shaped having an axis and defining a substantially coaxial cavity therein with a substantially coaxial first aperture opening into the cavity at a base portion surrounding the lip portion and a substantially coaxial second aperture opening into the cavity at an upper portion circumscribing the shank portion; and an annularly shaped substantially flat retainer ring bonded to the boot at the base portion and being substantially concentric with the first aperture and having a plurality of radially inwardly extending fingers with a finger aperture in each finger, wherein the finger apertures reduce a bending strength of the fingers in response to an axial force thereagainst.

8. A pivotal joint assembly as claimed in claim 7, wherein the apertures in the fingers are open in a direction substantially parallel to the axis.

9. A pivotal joint assembly as claimed in claim 7, wherein the elastomeric boot is disposed in part in the finger apertures.

10. A pivotal joint assembly as claimed in claim 7, wherein the boot passes from a first side of the ring through the finger apertures to a second side of the ring.

* * * * *